Patented Feb. 4, 1947

2,415,294

UNITED STATES PATENT OFFICE 2,415,294

PREPARATION OF 2-CHLOROBUTADIENE-1,3

Arthur A. Levine and Oliver W. Cass, Niagara Falls, N. Y., assignors to E. I. du Pont de Nemours & Company, Wilmington, Del., a corporation of Delaware No Drawing. Application May 22, 1940, Serial No. 336,625

8 Claims. (Cl. 260—655)

This invention relates to the preparation of 2-chlorobutadiene-1,3 and more particularly to the preparation of this compound from products obtained by chlorinating 2-chlorobutene-2.

This application is a continuation-in-part of our copending application Serial No. 234,693, filed October 12, 1938.

2-chlorobutadiene-1,3 is a colorless liquid having an atmospheric boiling point of 59.4° C. The compound may be readily polymerized and because of this property, it has received considerable attention for use in the preparation of synthetic rubber-like products.

It is an object of the present invention to provide a convenient and practical method for preparing 2-chlorobutadiene-1,3. A further object is to provide a method for the preparation of this compound by dehydrochlorination of products obtained by chlorinating 2-chlorobutene-2. These and still further objects will be apparent from the following description of our invention.

The above objects may be accomplished in accordance with our invention by subjecting products which are obtained by chlorinating 2-chlorobutene-2 to pyrolysis in the vapor phase. When 2-chlorobutene-2 is chlorinated, either in the liquid or vapor phase, for example, at temperatures ranging from 0 to 125° C., products are obtained which may be readily converted to 2-chlorobutadiene-1,3 by the method of our invention. These products include 2,2,3-trichlorobutane and two isomeric dichlorobutenes boiling at temperatures of 111° to 112° C., and 130° to 131° C. Any of these three compounds or mixtures thereof when pyrolyzed in the vapor phase yields 2-chlorobutadiene-1,3. We have discovered that such pyrolysis may be effected so as to obtain 2-chlorobutadiene-1,3 as substantially the only monochlorobutadiene reaction product.

The dehydrochlorination of 2,2,3-trichlorobutane, and the dichlorobutenes mentioned above, or mixtures of those compounds may be effected in the vapor phase in accordance with our invention in the presence or absence of dehydrochlorination catalysts or of diluent materials such as steam, nitrogen and the like. The use of a diluent such as steam does not appear to be particularly advantageous since excellent results may be obtained in the absence of such materials or even in the absence of catalytic materials. However, the presence of a material which catalyzes the dehydrochlorination of chlorinated organic compounds in the vapor phase, under some conditions offers certain advantages. As a general matter, when a suitable catalyst is employed, the yield of 2-chlorobutadiene-1,3 is somewhat higher and the rate of formation is accelerated.

The various dehydrochlorination catalysts which are generally effective in effecting removal of hydrogen chloride from chlorinated organic compounds in the vapor phase may be used successfully in practicing our invention. Of particular value, are the salts of alkaline earth metals, particularly alkaline earth metal halides such as magnesium chloride, barium chloride, calcium chloride and the like. These substances are particularly effective as catalysts for effecting the conversion of the above mentioned trichlorobutane and dichlorobutenes to 2-chlorobutadiene-1,3 without the formation of by-product monochlorobutadienes. Magnesium salts, especially magnesium chloride, magnesium sulfate and mixtures of the two, are particularly valuable as catalysts in that they have a desirable accelerating effect upon the pyrolysis reaction to form 2-chlorobutadiene-1,3.

The present method may be practiced by operating at temperatures over a wide range, e. g. from about 300° C. up to temperatures at which 2-chlorobutadiene-1,3 is decomposed at an excessive rate. As a general matter operation within the temperature range 400-600° C. has been found to produce good results, the temperature range of 470-520° C. being preferred.

The 2,2,3-trichlorobutane which may be used as starting material in practicing the present method is a compound having an atmospheric boiling point of 141.6° to 142.8° C. and a density of $$1.2672 \frac{20}{4}$$

The two isomeric dichlorobutenes which may be used as raw materials include a dichlorobutene which boils at 111° to 112° C. and has a density of $$1.1380 \frac{20}{4}$$

and a second dichlorobutene which boils at 130° to 131° C. and has a density of $$1.173 \frac{20}{4}$$

These isomeric dichlorobutenes are believed to be 2,3-dichlorobutenes, probably isomers of 2,3-dichlorobutene-2. The preparation of these three compounds is described in our copending application Serial No. 336,624, filed May 22, 1940. That copending application describes a method involving the liquid phase chlorination of 2-chlorobutene-2, preferably in the presence of a catalyst such as ferric chloride or stannic chloride, whereby mixtures of the compounds are readily obtained. Suitable mixtures of the compounds may also be obtained by chlorinating 2-chlorobutene-2 in the vapor phase for example, at a temperature ranging from the boiling point of the starting compound to 125° C. a temperature of 100° to 125° C. being preferred. The liquid phase chlorination may also be effected in the presence of actinic light to give suitable mixtures of the above compounds as described in the copending application of Cass and K'Burg Serial No. 336,626, filed May 22, 1940.

Any one of the above mentioned three compounds may be pyrolyzed to obtain 2-chlorobutadiene-1,3, or mixtures of any two or more of the compounds may be used. When the methods described in the aforementioned copending applications are employed for preparing these compounds, the compounds are generally obtained in the form of a mixture of all three compounds although in some instances, e. g. when employing stannic chloride as catalyst in the liquid phase, the amount of the dichlorobutene boiling at 130° to 131° C. is small.

The following examples are specific illustrations of the present invention.

Example I 2,2,3-trichlorobutane, 244 grams, was distilled slowly, the resulting vapors being passed continuously through an unpacked tube constructed of a borosilicate glass sold under the trade name "Pyrex," this glass being characterized by its low thermal coefficient of expansion and its high softening temperature. The glass tube was heated externally to provide a temperature in the tube of 470–490° C. The vapors issuing from the tube were fractionally condensed so as to separate unchanged trichlorides and dichlorides from the off-gases, the separated material being returned to the original distillation flask for recirculation through the heated tube. The uncondensed 2-chlorobutadiene-1,3, together with evolved hydrogen chloride, was passed through a series of cooled water scrubbers where the desired product collected as an oil. After recirculating unreacted trichlorobutane and dichlorobutene resulting from the removal of one mole of hydrogen chloride therefrom through the heated tube for a period of about three hours, the chlorobutadiene collected in the water scrubbers was fractionated to determine its composition. Distillation analysis of this product showed that it contained, aside from a slight amount of high boiling materials comprising chiefly trichlorobutane and dichlorobutenes, only one monochlorobutadiene, which was identified as 2-chlorobutadiene-1,3. The amount of purified product actually isolated by distillation corresponds to a yield of approximately 62.5%.

Example II

The apparatus used in carrying out this example consisted of a "Pyrex" glass tube 2 feet long and 1 inch in diameter enclosed in an electrically heated furnace. The inlet end of the tube was fitted with a suitably sized flask which served as a boiler for distilling products to be pyrolyzed into the reaction tube. The exit end of the tube was fitted with a fractional condenser which served to condense out material not converted to 2-chlorobutadiene-1,3. The apparatus was provided with means for leading such unconverted material from the condenser by way of a liquid seal back to the distillation flask for revaporization and recirculation through the reaction tube. Connected with the above mentioned condenser was a second condenser for condensing 2-chlorobutadiene-1,3, which second condenser was in turn connected with a scrubbing system for removing hydrogen chloride. Gases passing through this scrubbing system were then passed to a drier tube and finally to a low-temperature condenser for removing last traces of product from gases which were to be vented.

The distillation flask was charged with 1.51 moles of 2,2,3-trichlorobutane and heated so as to distill vapors of the trichloride at a uniform and suitable rate through the reaction tube. The first condenser into which the reaction products passed was maintained at a temperature such that the trichlorobutane and any intermediate dichlorobutenes formed would be condensed from the gaseous reaction mixture, the condensed material being returned to the distillation flask, vaporized therein and recycled through the reaction tube. After operating in this manner for 4½ hours while maintaining the temperature within the reaction tube at 470 to 490° C., the material remaining in the distillation flask amounted to about 30 grams. The crude product collected in the second and last condensers mentioned above and also in the water scrubbers, was washed with water, dried and fractionally distilled. There were obtained 0.5 mole of monomeric 2-chlorobutadiene-1,3 and 0.51 mole of dichlorobutenes consisting mostly of a dischlorobutene boiling at 111° C. The amount of these two compounds isolated corresponded to yields of 33% and 33.8%, respectively, based upon the amount of trichlorobutane originally employed.

Example III

The apparatus and procedure employed in this example were essentially the same as described in Example II, using a quartz tube in place of the "Pyrex" glass reaction tube. In starting the run, 4 moles of 2,2,3-trichlorobutane were charged into the distillation flask and during the run the temperature in the reaction tube was maintained at 400–465° C. After operating in the manner indicated in Example II for a period of 1¼ hours the combined crude product from the second and third condensers and from the water scrubbers was subjected to steam distillation, dried and then fractionally distilled. There were obtained 0.6 mole of monomeric 2-chlorobutadiene-1,3, 1.1 moles of dichlorobutenes and 1.28 moles of unconverted 2,2,3-trichlorobutane. The yields of 2-chlorobutadiene-1,3 and dichlorobutenes corresponded to 22% and 40.5% respectively, based upon the trichlorobutane not recovered.

Example IV

In this example a stainless steel, multiple-tube reactor was employed. The reactor consisted of 9 sections of stainless steel tubing each section being 0.5 inch in diameter and 2.5 feet long, the sections being arranged together so that the gases passed through the furnace nine times. The reactor was enclosed in an electrically-heated furnace and was maintained at a temperature of 480–510° C. 2,2,3-trichlorobutane was fed at a measured rate into a quartz tube vaporizer packed with porcelain chips and from there the vapors passed directly into the stainless steel reactor. The gaseous reaction products were passed from the reactor to a cold water condenser provided with a receiver. Gases not condensed by the condenser were passed through water scrubbers for removing hydrogen chloride, a calcium chloride drier, and to a final low-temperature condenser. Gases passing through this last condenser were vented through a wet-test meter. Products obtained in the two condensers and in the water scrubbers were combined and subjected to steam distillation. The crude product isolated by steam distillation was then dried and fractionated through a packed column 4 feet long.

During the course of the run 11.5 moles of 2,2,3-trichlorobutane were passed into the vaporizer at a rate of about 5 to 6 cc. per minute, the vaporizer being held at a temperature of 280 to 310° C. The product obtained from the steam distillation of the crude reaction products weighed 1324 grams after having been dried. Upon subjecting this crude product to fractional distillation there was obtained 1.8 moles of monomeric 2-chlorobutadiene-1,3, the remainder consisting chiefly of dichlorobutenes and unconverted 2,2,3-trichlorobutane. This unconverted material, including the dichlorobutenes, was again passed through the reactor under the same conditions as described for the first pass. From the second pass there were obtained 717 grams of dried crude product after steam distillation. Fractional distillation of this material yielded an additional 1.46 moles of monomeric 2-chlorobutadiene-1,3 and 5 moles of a mixture of dichlorobutenes containing approximately equimolar quantities of the two isomers boiling at 111 and 130° C. Also obtained were 0.8 mole of unconverted triochlorobutane and 103 grams of high boiling material. The over-all amounts of 2-chlorobutadiene-1,3 and of dichlorobutenes obtained corresponded to yields of 30.5% and 47%, respectively, based upon unrecovered 2,2,3-trichlorobutane. The yield of 2-chlorobutadiene-1,3 based upon 2,2,3-trichlorobutane not recovered as such or as dichlorobutenes was 57.2% of the theory.

*Example V*

The apparatus and procedure employed in this example were essentially the same as described in Example III. The experiment was carried out, however, using as the starting material 3 moles of the dichlorobutene isomer boiling at 111°–112° C. Four grams of phenol were added to the starting material, the purpose of the phenol being to inhibit polymerization of the desired product. The temperature in the quartz reaction tube was maintained at 410–430° C. during the course of the experiment. The dichlorobutene was vaporized and passed through the reactor tube during the course of 2 hours, during which time the boiling point of the dichlorobutene in the distillation flask rose from 111° C. to about 135° C. There were isolated from the reaction product, employing the method described in the foregoing examples, 0.91 mole of monomeric 2-chlorobutadiene-1,3 and 1.1 moles of unconverted dichlorobutene. The yield of 2-chlorobutadiene-1,3 was 48% of the theory based upon the unrecovered dichlorobutene.

*Example VI*

The apparatus and procedure used in this example were essentially the same as described in Example IV except that 752 grams of a mixture of materials obtained by chlorinating 2-chlorobutene-2 in the presence of light at 35° C. was used as starting material. The composition of the starting material was 116 grams (1.28 moles) of 2-chlorobutene-2, 393 grams (3.15 moles) of dichlorobutene, 179 grams (1.11 moles) of 2,2,3-trichlorobutane and 64 grams of high boiling materials. The temperature of the reactor tube was maintained at 480–500° C. and after operating for a period of 3½ hours 626 grams of crude product were obtained. The product obtained from a single pass through the reactor was washed, and then subjected to rapid distillation whereby there was isolated 577 grams of distilled, mixed products. The 2-chlorobutadiene-1,3 was isolated from this mixture of products as a polymer by subjecting the mixture to polymerization in the presence of benzoyl peroxide, the polymerization treatment being followed by a steam distillation treatment to remove and recover volatile products. There were isolated by means of this procedure 1.56 moles of polymerized 2-chlorobutadiene-1,3, 2.3 moles of dichlorobutene and 0.2 mole of 2,2,3-trichlorobutane. The amount of 2-chlorobutadiene-1,3 isolated in the form of its polymer, corresponded to a yield of 88.5% based upon the unrecovered dichlorobutene and trichlorobutane.

*Example VII*

The apparatus and procedure employed in this example were essentially the same as described in Example IV using as starting material a mixture containing 4.43 moles of the dichlorobutene isomer boiling at 111° to 112° C. and 1.57 moles of 2,2,3-trichlorobutane. Pyrolysis of the mixture was carried out at a temperature of 485–490° C. during a period of three hours. Fractional distillation of the crude reaction product obtained from a single pass through the reactor resulted in the obtainment of 1.23 moles of monomeric 2-chlorobutadiene-1,3, 2.8 moles of dichlorobutene and 0.26 mole of 2,2,3-trichlorobutene. The yield of 2-chlorobutadiene-1,3 was 42% based upon the unrecovered dichlorobutene and trichlorobutane.

*Example VIII*

The apparatus of this example was essentially the same as that described in Example II except that a quartz reactor tube was used and no provision was made for recycling unconverted products. The quartz tube was packed with carbon impregnated with barium chloride which served as a catalyst. During the course of 1¾ hours, 3 moles of 2,2,3-trichlorobutane vapor were passed through the reaction tube which was held at a temperature of 290–300° C. The crude reaction product was washed with water, dried and fractionally distilled to give 0.45 mole of monomeric 2-chlorobutadiene-1,3, 1.19 moles of dichlorobutenes (boiling at 101° and 131° C.) and 1.06 moles of unconverted 2,2,3-trichlorobutane. The amount of 2-chlorobutadiene-1,3 isolated corresponded to a yield of 60% based upon the trichlorobutane not recovered as such or as dichlorobutene.

The present method is well suited for practice on a commercial scale inasmuch as it is simple and results in good conversion of the starting material to the desired product. The fact that no monochlorobutadiene other than 2-chlorobutadiene-1,3 results from the process is particularly advantageous in that it is possible to obtain the desired product in substantially pure form without employing elaborate purification methods. It may be desirable in the normal operation of the present process on a commercial scale to add small amounts of materials to the substances being pyrolyzed, which materials are effective in inhibiting polymerization of 2-chlorobutadiene-1,3. As examples of such materials are mentioned amines, phenolic compounds and the like substances.

The product obtained by the present method may be polymerized to produce various rubberlike products which are highly useful for various purposes. The method may be practiced employing reaction tubes made of various construction materials such as glass, iron, nickel, copper or stainless steel. Operation at atmospheric pressure is convenient; however, pressures either above or below atmospheric pressure may be employed in accordance with our invention.

As many widely different modifications of the present invention may be practiced without departing from the spirit and scope thereof, it is to be understood that the invention is not to be limited by the foregoing description and examples, which are intended merely to be illustrative of the invention, except as indicated in the appended claims.

We claim:
1. A method of preparing 2-chlorobutadiene-1,3 comprising subjecting 2,2,3-trichlorobutane to vapor phase pyrolysis at a temperature of 300 to 600° C.
2. A method of preparing 2-chlorobutadiene-1,3 comprising subjecting 2,2,3-trichlorobutane to vapor phase pyrolysis at a temperature of 470-520° C.
3. A method of preparing 2-chlorobutadiene-1,3 comprising subjecting 2,2,3-trichlorobutane to vapor phase pyrolysis at a temperature of 300 to 600° C. in the presence of a dehydrohalogenation catalyst.
4. A method of preparing 2-chlorobutadiene-1,3 comprising subjecting 2,2,3-trichlorobutane to vapor phase pyrolysis at a temperature of 300-600° C. in the presence of a salt of an alkaline earth metal.
5. A method of preparing 2-chlorobutadiene-1,3 comprising subjecting 2,2,3-trichlorobutane to vapor phase pyrolysis at a temperature of 300 to 600° C. in the presence of a magnesium salt.
6. A method of preparing 2-chlorobutadiene-1,3 comprising subjecting 2,2,3-trichlorobutane to vapor phase pyrolysis at a temperature of at least 400° C.
7. A method of preparing 2-chlorobutadiene-1,3 comprising subjecting the mixed product obtained by chlorinating 2-chlorobutene-2 to vapor phase pyrolysis at a temperature of at least 400° C.
8. A method of preparing 2-chlorobutadiene-1,3 comprising subjecting the mixed product obtained by chlorinating 2-chlorobutene-2 to vapor phase pyrolysis at a temperature of 300 to 600° C.

ARTHUR A. LEVINE.
OLIVER W. CASS.

REFERENCES CITED

The following references are of record in the file of this patent:

UNITED STATES PATENTS

| Number | Name | Date |
|---|---|---|
| 2,038,538 | Carothers | Apr. 28, 1936 |
| 2,180,115 | Lange et al. | Nov. 14, 1939 |

OTHER REFERENCES

"Chemical Abstracts," vol. 31, 1937, col. 2580 (Abstract of article by Klebanskii et al., in Jour. Applied Chem. U. S. S. R., vol. 9, 1936, pages 1985–93).